United States Patent [19]
Wolstenholme et al.

[11] Patent Number: 5,807,516
[45] Date of Patent: Sep. 15, 1998

[54] PROCESS OF MAKING MOLECULARLY ORIENTED POLYMER PROFILES

[75] Inventors: Jack Wolstenholme, Edmonton; Ernesto S. Tachauer, Oakville; Larry R. Morris, Yarker, all of Canada

[73] Assignee: Westaim Technologies Inc., Fort Saskatchewan, Canada

[21] Appl. No.: 644,787

[22] Filed: May 10, 1996

[51] Int. Cl.⁶ .................................................. B29C 47/90
[52] U.S. Cl. ........................................ 264/210.2; 264/237
[58] Field of Search ............................. 264/210.2, 237, 264/288.4

[56] References Cited

U.S. PATENT DOCUMENTS

| | | | |
|---|---|---|---|
| 2,177,660 | 10/1939 | Kimble et al. | 264/210.2 X |
| 4,022,863 | 5/1977 | Karass et al. | 264/210.6 |
| 4,858,139 | 8/1989 | Wirtz | 364/473 |
| 5,133,922 | 7/1992 | Kaeufer et al. | 264/280 |
| 5,171,815 | 12/1992 | Magill et al. | 526/348.1 |
| 5,176,861 | 1/1993 | Ishikawa | 264/101 |
| 5,234,652 | 8/1993 | Woodhams et al. | 264/210.2 |

OTHER PUBLICATIONS

The Strength and Stiffness of Polymers, Anagnostis E. Zachariades and Roger S. Porter, "Plastics Engineering 4", Chapter 1 (Solid–State Extrusion of Thermoplastics), pp. 1–50 (Undated).

*Primary Examiner*—Leo B. Tentoni
*Attorney, Agent, or Firm*—Arne I. Fors

[57] ABSTRACT

A continuous process for the production of an oriented high modulus profile is provided together with the novel profiles produced thereby. A dry polymer feedstock is melted and extruded through a die to form a profile precursor having a constant cross-section and specific dimensions. Sequential passage of the profile precursor through roller dies reduces its thickness whilst imparting molecular orientation thereto. The profile is cooled under tension to freeze in the molecular orientation thereof.

4 Claims, 1 Drawing Sheet

PROCESS OF MAKING MOLECULARLY ORIENTED POLYMER PROFILES

FIELD OF THE INVENTION

The present invention relates to a continuous process for the manufacture of high strength, high modulus profiles from polymeric resins and to the profiles produced thereby. More specifically, the polymer products of the process of the invention have oriented molecular structures.

BACKGROUND OF THE INVENTION

Organic polymers typically comprise long molecular chains having a backbone of linked carbon atoms. Despite the carbon—carbon chemical bond being one of the strongest in nature, the potential strength of the polymer chains is not realized because of their random orientation and entanglement, as described in "The Strength and Stiffness of Polymers", edited by A. E. Zachariades and R. S. Porter published by Marcel Dekker, 1983.

In order to obtain optimum physical strength properties, theoretically, the polymer chains need to be disentangled and oriented in parallel one to another.

The orientation of polymers may be effected by several known techniques including gel drawing, plastic flow extrusion or solid state deformation.

The degree of molecular orientation is generally defined by the draw ratio which in the case of drawn fibres is defined as the ratio of the length obtained after stretching ($l_n$) to that of the original length ($l_o$). The tensile modulus and strength of said polymers increase almost linearly with the draw ratio ($\lambda$).

Gel drawing has typically been utilized for the production of fibres. Whilst some fibres available, for example polyethylene, have exhibited remarkable stiffness (i.e. a modulus of about 200 gigapascals (GPa)) and tensile strength properties (4 GPa) nevertheless such products are expensive due to the complexity of the gel drawing process.

The products prepared by the lower cost solid state deformation processes have not been found to equal the strength properties that can be achieved by gel drawing methods.

The fabrication of sophisticated oriented profiles using prior art plastic extrusion processes on a commercial scale, whilst possible for polyethylene, has not proved viable for polyethylene terephthalate (PET). Oriented profiles are defined as articles having specific dimensions, typically a thickness greater than one millimeter, with constant cross-section and infinite length. Such profiles will have some degree of molecular orientation and thus a high modulus, usually of the order of several gigapascals and a higher modulus should be obtainable for lower draw ratios for PET. Although it is known to produce strapping or thin sheets of polyethylene terephthalate, which is achieved by stretching the polymer in its predeformation state, it has simply not heretofore proved possible to manufacture oriented polyethylene terephthalate profiles having specific dimensions, similar to glass fibre reinforced pultrusions. Simply stated, processing techniques for polyethylenes and polypropylenes may not be straightforwardly extrapolated to polyethylene terephthalate.

Woodhams et al. in U.S. Pat. No. 5,234,652 disclose a process involving the extrusion of a high molecular weight plastic, at or about its melt temperature, and deforming the extrudate by drawing to produce an oriented extrudate. The extrudate is rapidly cooled to preserve the orientation thereby enabling the production of high strength, high modulus articles.

In U.S. Pat. No. 4,022,863 issued to Karass et al., there is described a polyethylene terephthalate strapping and a process for the preparation thereof. The process broadly consists of drying the polyester resin and extruding said resin at a temperature between 482° F. and 572° F. The extrudate is quenched by cooling to 122° F. and stretched in two consecutive steps at 212° F. The draw ratio in the first stretching step is about 4 to 1 whereas that in the second is about 2–2.5 to 1.

Further patents documenting a fragmentary section of the art include U.S. Pat. No. 4,858,139, U.S. Pat. No. 5,133,922, U.S. Pat. No. 5,171,815 or U.S. Pat. No. 5,176,861.

SUMMARY OF THE INVENTION

It is a primary objective of the present invention to provide a continuous process for the production of an oriented, high strength, high modulus profile prepared from high molecular weight polymeric resins, particularly polyethylene terephthalate. The objective further extends to the products produced thereby.

In accordance with the present invention, there is provided a continuous process for the production of an oriented high modulus profile having a thickness greater than one millimeter produced from a high molecular weight polymer resin. The process comprises, in combination, melting and extruding dry polymer feedstock through a die having a constant cross-section. The semi-molten extrudate is then pumped through a calibrator to thereby provide a solid, deformable profile precursor having predetermined sectional and optionally angular, dimensions. The profile precursor is then sequentially passed through a predetermined number of roller dies, said dies being functional to reduce the profile precursor thickness by a factor of at least five in the case of polyethylene terephthalate whilst maintaining the temperature of the initial through to final profile in the range of about 200° C. Tension is applied to said profile during cooling thereof to thereby retain the molecular orientation of the final product. It is to be emphasized that during the process minimal stretching (or drawing) of the profile precursor and progressively formed profiles takes place. Furthermore, and most significantly, there is essentially no change in the shape of the profile or its specific dimensions other than the requisite reduction in thickness thereof.

Broadly stated, there is provided a continuous process for the production of an oriented high modulus profile from a high molecular weight polymer resin which comprises in combination:

melting and extruding dry polymer feedstock through a die of constant cross-section to thereby provide a deformable profile precursor having predetermined sectional, and optionally angular, dimensions; sequentially passing said profile precursor through a predetermined number of roller dies to form said profile, said roller dies being functional to progressively reduce the profile precursor thickness by a predetermined factor, thereby imparting increasing molecular orientation thereto and applying sufficient tension to retain the profile dimensions and preserve the molecular orientation thereof; said reduction being effected under controlled temperature conditions; and cooling said profile under tension to thereby freeze in the final molecular orientation thereof.

In a second broad aspect, the invention extends to a molecularly oriented polymer profile formed of polyethylene terephthalate having a modulus ranging from between about 8 to 15 GPa and a thickness greater than about one millimeter.

The invention extends still further to a polyethylene terphthalate product having increased molecular orientation with concomitant higher properties which are attained by reducing the profile thickness by a factor greater than 4.5.

DESCRIPTION OF THE DRAWINGS

The present invention will be better understood with reference to the detailed description below and the following FIGURE.

DESCRIPTION OF THE PREFERRED EMBODIMENT

Figure 1:
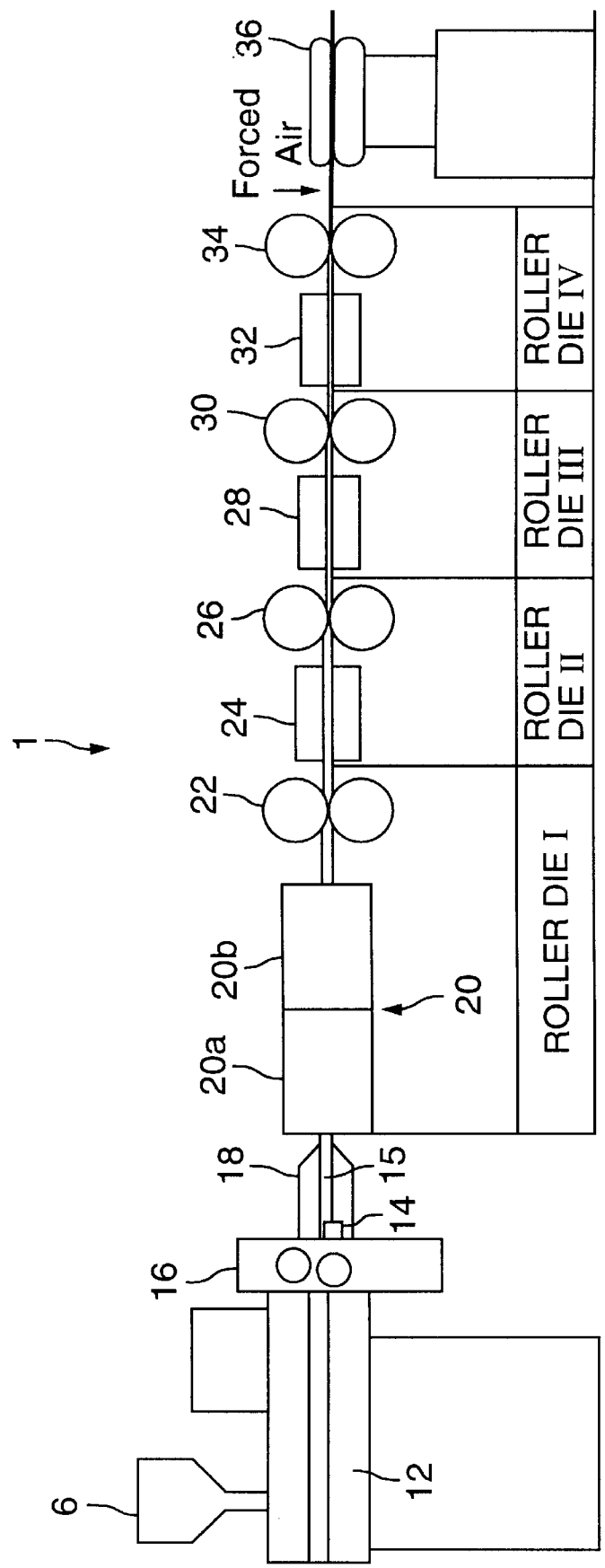
FIG. 1 is a schematic of the process for the production of oriented profiles.

The continuous process for the production of an oriented polymeric profile comprises in combination: melting the dry polymer resin feedstock in an extruder; forcing the semi-molten polymer through the extruder die having a predetermined configuration; forcing the semi-molten extrudate through a calibrator to thereby produce a solid, deformable profile precursor having predetermined dimensions; sequentially introducing said profile precursor between sets of rollers to a) grab said profile and reduce said profile thickness a first time, b) passing said profile through a second set of rollers which grab the thinner profile to maintain the desired tension and thus preserve orientation c) passing the profile through the requisite number of rollers to reduce the thickness by a predetermined amount and maintain orientation and d) finally cooling said profile under tension to thereby freeze in the final molecular orientation whilst the tension is maintained. The tension must be sufficient to retain the molecular orientation, but drawing is always to be avoided to prevent modification to the profile shape or dimensions. If the respective tensions are maintained, then the gap between the rollers determines the degree of molecular orientation imparted. The reduction in thickness causes an increase in length of the profile. However it has been observed that at draw ratios in excess of about four, increases in width can also occur.

The preparation of 'profiles', which are defined, as mentioned earlier, as articles having a constant cross-section, infinite length and specific dimensions will now be described. The specific dimensions are dictated by the configuration of the rollers and maintained throughout processing by the application of controlled tension.

The profiles may be sheets, rods or angular shapes as required. Additionally, profile sheets may, after cutting, be pressure formed into complex shapes. The applied pressure should be sufficient to maintain the molecular orientation both during and after the moulding process.

The polyethylene terephthalate (PET) feedstock is exhaustively dried: usually a period of about 6 h is sufficient for virgin polymer, but at least about 24 h was found necessary for recycle PET. Once dried, the polymer is maintained in the dried condition until processed, to avoid depolymerization and hence subsequent embrittlement of the formed product.

Any suitable polymer selected from PET, polypropylene or polyethylene having suitable melt properties, may be utilized. As described herein, the process finds particular application with respect to PET. Virgin PET pellets may be obtained from numerous suppliers such as for example Du Pont or Eastman Kodak. Recycle PET is typically derived from ground up soft drink bottles and includes impurities such as glue, labels and so on. The preferred product, comprising about 98% pure PET flakes, has been physically cleaned and may have been treated chemically in a post polymerization process in an attempt to reverse any depolymerization that has taken place since manufacture.

Having reference to FIG. 1, there is shown at 1 a schematic of the complete process. The dried flakes or pellets are introduced through a hopper 10 into a single screw extruder 12. The extruder 12 is functional to deliver through a conventional extruder die 14 a thick, semi-molten polymer profile precursor. The temperature of the extrudate leaving the die 14 would range between 265° to 270° C.

A gear pump 16 is added to help force the extrudate via passage 15 through a calibrator 18 where it is air or water cooled to a temperature in the range of about 200° C. to thereby "set" the shape of the profile. When the PET grades currently available exit the die 14, they do so, as stated previously, in a semi-molten state, thus continuing to flow and lose shape prior to eventual solidification. Therefore, it is necessary to cool the semi-molten PET profile precursor to specific dimensions which is the function of the calibrator 18.

The calibrated profile is then passed through a heated tunnel 20 typically comprised of first and second tunnels 20a and 20b respectively, to adjust its temperature prior to deformation by the first roller. The temperature of tunnel 20 is maintained at approximately 200° C. The heated profile is then passed through a first set of rollers 22 to impart a degree of molecular orientation thereto. The first tunnel 20 and rollers 22 are termed herein "Roller Die I".

Similarly, the precursor profile is sequentially passed through Roller Dies II, III and IV which comprise tunnels 24, 28 and 32 and rollers 26, 30 and 34 respectively to effect the requisite thickness reduction and increase in the molecular orientation to arrive at the desired final profile. The rotational speed of the 2nd, 3rd and 4th rollers is set to maintain the orientation and dimensions imparted by the previous roller (1st, 2nd and 3rd). Typically, the total thickness reduction for PET profiles would be of the order of four or five times, whereas for polypropylene or polyethylene it may be as high as twenty times.

The rollers are specifically configured to deliver sufficient torque to achieve the desired profile and are provided with a means for heating thereof. The tunnels are constructed as boxes fabricated of foamed ceramic having an aperture in their bases for the introduction of hot air. The tunnels are typically maintained at temperatures between 150° to 220° C.

The draw ratio of the heated profile through each of the roller dies typically ranges from about 1.5 to 2.5 for PET and most preferably is kept as high as practicable.

Forced air at ambient temperature, or about 20° C. is passed over the profile after it exits rollers 34 to effect cooling thereof. Alternately other means of cooling such as passage through cold water may be used A puller 36 is utilized to tension the profile thereby ensuring retention of the final dimensions and orientation thereof. This is a prerequisite because until the temperature of the polymer drops below its glass transition temperature (approximately 75° C. for PET), the molecules are able to resume some of their original configuration with concomitant loss of dimensions and orientation.

In summary, the operating conditions selected are such that the lowest possible process temperature is utilized. The first tunnel in the Roller Die provides the entry temperature of the profile precursor into the first roller set, the rollers being functional to reduce the thickness of the profile and operating at their own preset temperatures. Subsequent rollers and the puller are also functional to maintain the tension on the profile and to retain the exit dimensions from the previous roller thereof.

An embodiment of the invention for producing oriented PET profiles is provided in the following non-limitative example.

EXAMPLES

Example I

The polyethylene terephthalate flakes were continuously introduced into an insulated drying hopper like that manufactured by Lutek Equipment Inc., Model CD 100H Conair Compudry having Power Miser II computer interface, return air temperature readout, CFH monitor and after cooler operable in the 30°–200° C. temperature range.

From the hopper the dried flakes were passed to an extruder having a gear pump like that manufactured by LCI Corporation, Model LCI TRUDEX 45/28 having a discharge pressure of 10,000 psi, maximum differential pressure of 7,000 psi and output rate of 100–300 lbs. The operating temperatures of the extruder ranged from 260°–280° C. in the barrel zone and 275° C. in the die zone. The temperatures of the gear pump comprised 270° C. in the suction section, 275° C. in the gear pump and 275° C. at discharge. The suction pressure of the gear pump was fixed at about 400 psi, its speed being 34 RPM.

The extrudate was forced through a flat extrusion die/calibrator like that manufactured by Metaplast Ltd. which had been adapted to extrude a profile of 10 mm×100 mm and included adaptors, a head flange and heater bands. The calibrator was formed of anodized 6061 aluminum having water and vacuum ports.

From the calibrator the profile precursor was passed through a heated tunnel (analogous to tunnel 20 of FIG. 1) to a first roller assemblage manufactured by Centre de Recherche Industrielle du Quebec which was modified to increase the maximum torque of the motors and thus the draw ratio. The roller assemblage comprised two sets of rollers, analogous to rollers 22 and 26 in FIG. 1 having a heated tunnel analogous to tunnel 24 of FIG. 1 therebetween. The speed of the profile was maintained at 80 cm/min. The tunnel temperature of the first and subsequent tunnels was held at 200° C.

From the first roller assemblage, the profile was passed through a heated tunnel (analogous to tunnel 28 of FIG. 1) to a second roller assemblage which would be like that manufactured by Metform International Ltd. The roller assemblage comprised two sets of rollers analogous to rollers 28 and 34 of FIG. 1 having a heated tunnel (analogous to tunnel 32 of FIG. 1) therebetween. The drive selected had a 5 HP AC. rating with variable frequency controllers providing speed control. The oil heater for supplying the heated rollers was like that manufactured by Buhler Canada Inc. provided with dual zone heating and cooling, a microprocessor controlled with external sensor connection and operable in the 30°–320° C. range.

After passage through a cooling forced air stream at ambient temperature of about 20° C., the profile was tensioned by a puller having a maximum puller tension of 500 lbs. The maximum draw ratio obtained was about 3.8.

A summary of the results in terms of maximum tension and draw ratio is given in Table I herebelow.

TABLE I

| Temperature of Tunnels 20, 24, (°C.) | Temp of Tunnels 28, 32 & X* (°C.) | Maximum Tension (lbs) | Maximum Draw Ratio |
|---|---|---|---|
| 200 | 150 | 1600 | 3.8 |
| 200 | 100 | 2000 | 4.0 |
| 200 | 50 | 2200 | 4.2 | wherein X* denotes the gap between the last roller and the puller.

The gap between rolls 26 was 1.25 mm.

The results of mechanical strength tests of flat oriented profile are given in Table II below.

TABLE II

| Draw Ratio | | >4.6 | 4.66 |
|---|---|---|---|
| Modulus (GPa) | mean | 10.65 | 10.3 |
| | minimum | 10.00 | 9.4 |
| | maximum | 12.00 | 12.3 |
| | standard deviation | 0.75 | 1.2 |
| Stress at break (MPa) | mean | 344.4 | 344.5 |
| | minimum | 244.1 | 275.7 |
| | maximum | 405.9 | 414.1 |
| | standard deviation | 63.7 | 64.3 |

Example II

This example describes the production of v-shaped angular profiles. The extruder and gear pump temperatures were identical to those detailed as was the remainder of the equipment with the exception that a v-shaped die/calibrator and v-configured rollers were utilized. The gear pump speed corresponding to 80 cm/min was 30 RPM. The maximum tension measured on rolls 32 was approximately 2000 lbs. The maximum draw ratio achieved without fracture was 3.3. Selected samples having differing draw ratios were tested for mechanical properties evaluations, the results being presented in Table III below.

TABLE III

| Draw ratio | Modulus, E mean (GPa) | Standard deviation on E (GPa) | Stress at break (MPa) | Standard deviation on stress, MPa |
|---|---|---|---|---|
| 1.18 | 3.35 | 0.1 | 79.5 | 1 |
| 1.80 | 5.0 | 0.4 | 108.1 | 3 |
| 2.43 | 6.2 | 0.25 | 105.0 | 10 |
| 2.87 | 9.35 | 2.4 | 240.0 | 5 |
| 3.20 | 10.2 | 0.8 | 275.0 | 15 |
| 3.30 | 10.9 | 0.5 | 352.0 | 20 |

Example III

This example demonstrates the potential for forming complex shapes from oriented sheet (namely flat profiles) by compression moulding techniques. A highly oriented sample having a draw of 4.4 was cut into 10 cm by 10 cm slabs from the profile and pressed between the platens of a press at 200° C. for 15, 30, and 60 seconds at 100 tons and 60 seconds at 1 ton.

The tensile testing results are given in GPa in Table IV herebelow.

TABLE IV

| Condition | Original | 15s, 200° C. 100 tons | 30s, 200° C. 100 tons | 60s, 200° C. 100 tons | 60s, 200° C. 1 ton |
|---|---|---|---|---|---|
| Modulus | 11.37 | 10.38 | 10.96 | 10.18 | 9.78 |
| Standard deviation | 1.33 | 1.06 | 0.95 | 1.16 | 0.44 |

Example IV

Experiments were performed on PET molded pieces (100×10×10 mm) to determine the maximum reduction ratio achievable without tension in a batchwise manner with a flat PET sheet. While the profile was preheated to 240° C., the rolls were heated to only 200° C. to avoid melting during rolling. A sample was rolled under these conditions 15 consecutive times. The machine settings and the results obtained are presented in Table V. The highest tensile modulus (11.4 GPa), was achieved after the 15th reduction corresponding to an overall reduction ratio of 4.52. The width of the sample increased from 10 mm to 13.9 cm.

TABLE V

| Conditions: | Temperature of Polymer: | 240° C. |
|---|---|---|
| | Temperature of Rolls: | 200° C. |
| | Roll Speed: | 200 cm/min |

L = Length between marks (mm)
S = Sample thickness (mm)
W = Sample width (mm)
$L_0/L$ = Draw ratio measured by length

| | Step | | | |
|---|---|---|---|---|
| | 0 | 5 | 10 | 15 |
| Roll gap (mm) | — | 2.5 | 1.0 | 0.5 |
| L (mm) | 100 | 242 | 336 | 452 |
| S (mm) | 10 | 4.2 | 2.3 | 1.48 |
| W (mm) | 9.5* | — | — | 13.9 |
| $L_0/L$ | — | 2.42 | 3.36 | 4.52 |
| TM (GPa) | — | — | — | 11.4 |
| TS (MPa) | — | — | — | 100 |

*After first roll (initially 10 mm)

It will be understood, of course, that modifications can be made in the embodiments of the invention illustrated and described herein without departing from the scope and purview of the invention as defined by the appended claims.

We claim:

1. A continuous process for the production of an oriented high modulus profile from a high molecular weight polymer resin which comprises in combination:

melting and extruding dry polymer feedstock through a die of constant cross-section to thereby provide a solid profile precursor having predetermined sectional, and optionally angular, dimensions and having molecular orientation imparted thereto; sequentially passing said profile precursor through a predetermined number of roller dies to form said profile, said roller dies being functional to progressively reduce the profile precursor thickness by a predetermined factor, thereby imparting increasing molecular orientation thereto and applying sufficient tension to retain the profile dimensions and preserve the molecular orientation thereof; said reduction being effected under controlled temperature conditions; and cooling said profile under tension to thereby freeze in the final molecular orientation thereof.

2. A process as set forth in claim 1 wherein said high molecular weight polymer is selected from the group consisting of polyethylene terephthalate, polypropylene and polyethylene.

3. A process as set forth in claim 1 wherein said polymer is polyethylene terephthalate and the thickness reduction of said profile precursor is at least five.

4. A process as set forth in claim 1 wherein said roller dies comprise a heated tunnel and a set of rollers, said rollers being functional to reduce the thickness of said profile precursor whilst maintaining a predetermined tension on said profile to thereby provide a constant cross-section thereto.

* * * * *

UNITED STATES PATENT AND TRADEMARK OFFICE
CERTIFICATE OF CORRECTION

PATENT NO.   : 5,807,516
DATED        : September 15, 1998
INVENTOR(S)  : Wolstenholme, et al It is certified that error appears in the above-identified patent and that said Letters Patent is hereby corrected as shown below:

On the title page, insert the following:

-- [30] Foreign Application Priority Data

Oct. 13, 1995 [CAX] Canada .......................... 2,160,517 --

Signed and Sealed this

Second Day of March, 1999

Attest:

Q. TODD DICKINSON

*Attesting Officer*      *Acting Commissioner of Patents and Trademarks*